No. 776,656. PATENTED DEC. 6, 1904.
C. G. FAWKES.
TIRE.
APPLICATION FILED SEPT. 19, 1903.
NO MODEL.
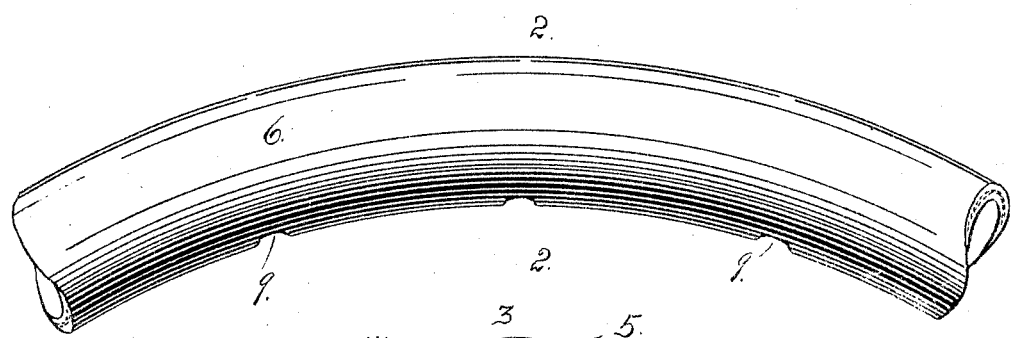
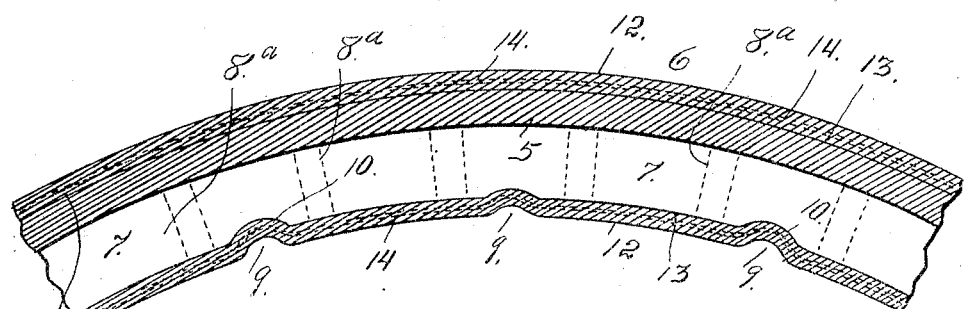
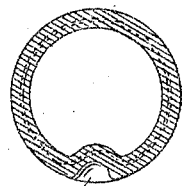
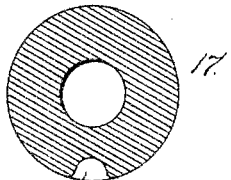
Witnesses
Otto E. Hoddick
Dena Nelson
C. G. Fawkes
Inventor
Attorney No. 776,656. Patented December 6, 1904.

UNITED STATES PATENT OFFICE.

CHARLES G. FAWKES, OF DENVER, COLORADO, ASSIGNOR TO THE FAWKES RUBBER COMPANY, OF DENVER, COLORADO.

TIRE.

SPECIFICATION forming part of Letters Patent No. 776,656, dated December 6, 1904.

Application filed September 19, 1903. Serial No. 173,911. (No model.)

*To all whom it may concern:*

Be it known that I, CHARLES G. FAWKES, a citizen of the United States of America, residing in the city and county of Denver and State of Colorado, have invented certain new and useful Improvements in Tires; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in tires adapted for use on bicycles or vehicles.

My improvements may be employed in connection with solid rubber, cushion, or pneumatic tires.

One object of the invention is to prevent tires of this class from creeping on the rims of the wheels.

The invention consists in forming recesses at suitable intervals in the inner periphery of the tires. The cement applied to the rim will naturally accumulate in these recesses, and when dry form small projections which prevent the movement of the tire. This feature is also valuable in connection with the manufacture of cushion and pneumatic tires, since the recesses are made by projections formed in the mold in which the tires are vulcanized. These projections press the canvas part of the tire inwardly, and this takes up the slack of the material which would otherwise exist on the inner periphery of the tire. These projections on the mold (not shown) also hold the material in position during the formation of the tire and facilitate the production of perfectly-shaped tires.

Having briefly outlined my improved construction, as well as some of the objects I expect to obtain thereby, I will proceed to describe the same in detail, reference being made to the accompanying drawings, in which is illustrated an embodiment thereof.

In the drawings, Figure 1 is a side elevation of a special construction of cushion-tire made in accordance with my invention. Fig. 2 is a cross-section on the line 2 2, Fig. 1. Fig. 3 is a section on the line 3 3, Fig. 2. Fig. 4 is a cross-section of a pneumatic tire provided with my improvement. Fig. 5 is a similar view of an ordinary cushion-tire provided with my improved feature.

The same reference characters indicate the same parts in all the views.

I will first describe the improvement in connection with the construction shown in Figs. 1, 2, and 3. This construction is provided with a core having a rib 5 adjacent the outer periphery of the tube 6. Connected with this rib and extending toward the inner periphery of the tube are two side parts 7, which diverge as they approach the opposite periphery of the tube, leaving a space 8 between them which is V-shaped in cross-section, having its widest part adjacent the inner periphery of the tube or the part which engages the rim of the wheel. (Not shown.) The side parts 7 of this core are provided with laterally-extending wings $8^a$. This form of tire is protected by Letters Patent No. 682,977, dated September 17, 1901. In the inner periphery of this tire or the part which engages the rim of the wheel when in place thereon are formed recesses 9, made by pressing the layers of rubber and canvas inwardly between the sides 7 of the core during the process of vulcanization, thus taking up the slack in the canvas and at the same time forming inward projections or protuberances 10, which aid in preventing the sides 7 of the core from collapsing, twisting, or becoming crooked or approaching each other during the formation of the tire. As shown in the drawings, the tubular part of the tire is composed of two layers 12 and 13 of rubber and an intermediate layer 14 of canvas.

In the form of construction shown in Fig. 4, 15 designates the tube and 16 one of the recesses formed in its inner periphery, while in the construction shown in Fig. 5, 17 designates the tube or body of the tire, and 18 a recess formed therein.

The mold used in the manufacture of these tires will form the subject-matter of a separate application.

Having thus described my invention, what I claim is—

1. A cushion or pnuematic tire formed of layers of canvas and rubber and provided with external recesses formed in its inner periphery, and interior protuberances corresponding in degree and coinciding as to position with the external recesses.

2. A cushion or pneumatic tire formed of layers of canvas and rubber, and having external recesses on its inner periphery, and interior protuberances coinciding with said recesses.

3. A cushion-tire having a core provided with separated side parts leaving a V-shaped opening between them, the tube of the tire having exterior recesses in its inner periphery, and interior projections coinciding with said recesses, and located between the side parts of the core.

4. A tire of the class described, said tire being formed of layers of canvas and rubber and having exterior recesses in its inner periphery, said recesses being formed by pressing the material inwardly whereby protuberances are formed within the hollow of the tire.

In testimony whereof I affix my signature in presence of two witnesses.

CHARLES G. FAWKES.

Witnesses:
AUGUST STAHNKE,
WILLIAM O. FAIST